Jan. 19, 1932.  G. E. DEAN ET AL  1,841,402

ROAD SCRAPER

Filed Sept. 23, 1929

Inventors
George E. Dean
Charles G. Willett
By Liverance & Van Antwerp
Attorneys Patented Jan. 19, 1932

1,841,402

UNITED STATES PATENT OFFICE

GEORGE E. DEAN AND CHARLES G. WILLETT, OF GRAND RAPIDS, MICHIGAN; SAID DEAN ASSIGNOR TO SAID WILLETT

ROAD SCRAPER

Application filed September 23, 1929. Serial No. 394,408.

This invention relates to road scrapers and is concerned with improvements and simplifications in the operating means for raising and lowering a scraper relative to the road surface over which it moves, being particularly concerned with improvements for the lifting mechanism as illustrated in the pending application of George E. Dean Ser. No. 237,662, filed December 5, 1927, now Patent No. 1,765,969.

The scraper is mounted for rocking movement on a supporting rock shaft beneath the chassis of a truck, and a connection is made between said rock shaft and a counter-shaft also mounted beneath the truck and forward of the rock shaft. In our invention a direct gearing connection is made between the counter-shaft and a vertical operating shaft which is positioned at one side of the chassis frame and at one side of the cab of the truck, so as to be directly accessible by the driver of the truck and yet out of the way and afford no interference to the driver in his operation of the truck. Such method of operating the counter shaft and the scraper rock shaft greatly simplifies the construction shown in the pending application of Dean, reduces the cost of manufacture, eliminates danger of breakage or getting out of order, to a considerable degree eliminates frame drilling and weakening thereof and makes the construction much better in every way because of the extreme simplicity and the much less number of parts required.

An understanding of the invention may be had from the following description taken in connection with the accompanying drawings, in which, Fig. 1 is a fragmentary side elevation of a truck equipped with our invention which is illustrated in full in side elevation.

Like reference characters refer to like parts in the different figures of the drawings.

The truck to which the scraper is applied includes a chassis frame having spaced apart side members 1. Hanger brackets 2 are mounted on and depend from the frame members 1 and are vertically adjustable with respect thereto. There are two of the hanger brackets at each side of the truck spaced from each other and between the lower ends of said brackets, at each side of the truck, a pair of horizontal bars 3 are mounted and securely attached to the lower ends of the hanger brackets.

Figure 2:
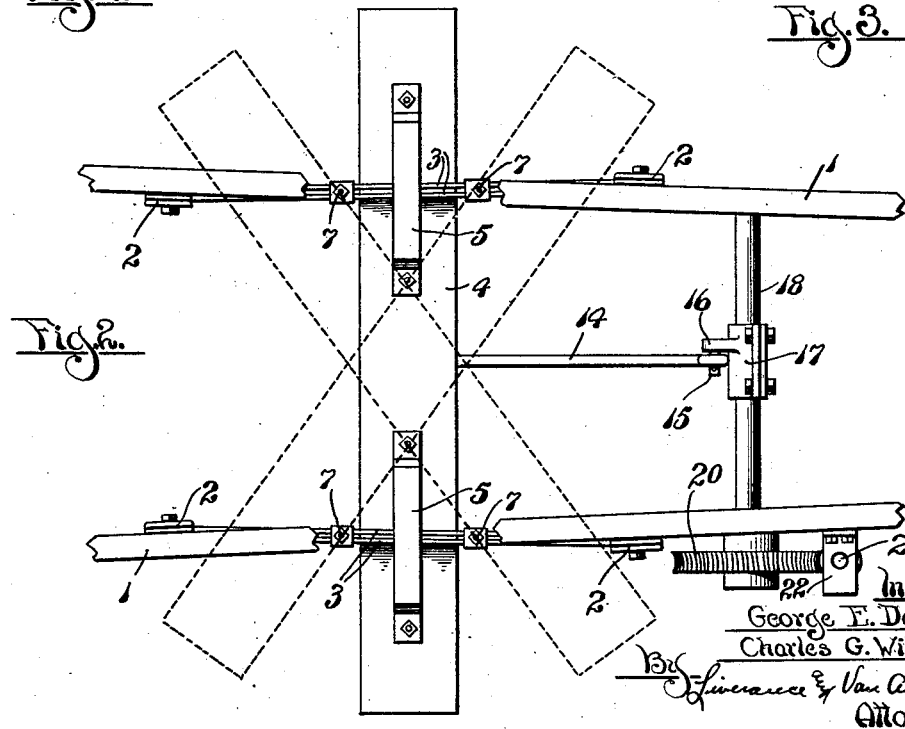
Fig. 2 is a plan view of the truck chassis and the scraper construction applied thereto with the truck body removed, certain parts of the chassis frame being broken away for a better disclosure.

The scraper is carried by the pairs of bars 3, one pair being located at each side of and under the truck. A supporting beam 4 in form of a channel lies underneath the bars 3 and is mounted thereon by means of the bars 5 which are permanently secured at their ends to the beam 4 and have raised intermediate sections passing over the upper edges of the bars 3. This permits an angular adjustment of the beam with respect to the bars 3 to an indefinite number of angular positions; also a reversal from an angular position in which the scraping is to one side of the road to another position in which the scraping will be to the opposite side of the road as indicated in dotted lines in Fig. 2. When the beam is adjusted to any desired position it is releasably held in such a position by means of the clips 6 which engage underneath the free edges of the flanges of the channel beam 4 and may be tightened and secured in place by tightening the nuts on the bolts 7 passing through said clips and between the bars 3 as shown.

At the under side of the beam 4, a plurality of depending supporting hangers 8 are permanently secured which carry a rock shaft 9. A scraper blade 10 is mounted on the rock shaft through the medium of spring arms 11 which are identical in construction with the like spring arms shown in the Dean application previously mentioned. Rocking the shaft 9 raises or lowers the free edge of the scraper blade 10 with respect to the road surface over which the truck passes and with which the scraper may engage.

An arm 12 is permanently secured in any suitable manner to the shaft 9 midway between its ends so that when the beam 4 is adjusted to different angular positions it turns about a vertical axis substantially co-incident with the vertical center line of the arm 12. An eye 13 is secured to and extends forward from the lower end of the arm 12. A link 14 has an eye at its rear end connecting with the eye 13 and a second eye at its front end passing over a lateral pin 15 projecting from an arm 16 cast integral with a clamping member 17 secured to a horizontal counter-shaft 18, located in front of the rock shaft 9 and at right angles to the longitudinal axis of the truck frame.

Figure 1:
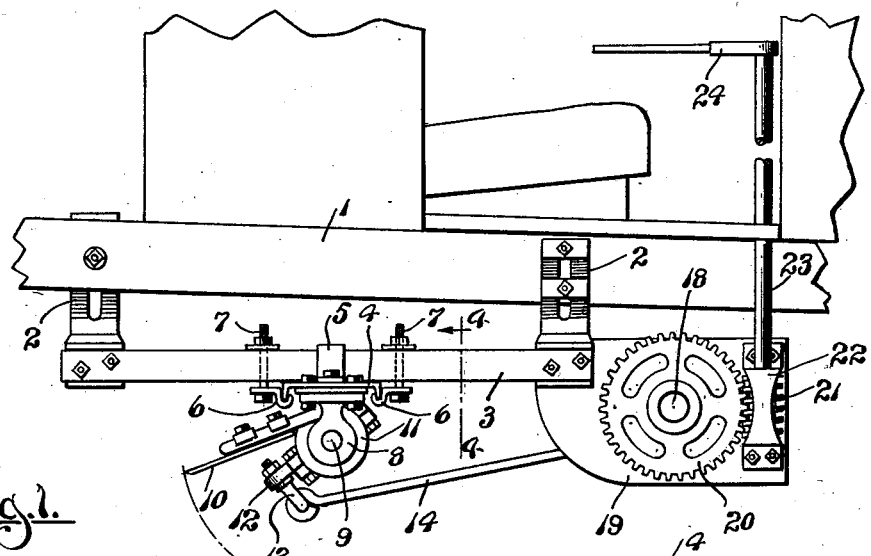
Figure 4:
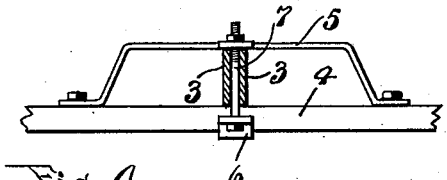
Fig. 4 is a vertical section on the plane of line 4—4 of Fig. 1.
Figure 3:
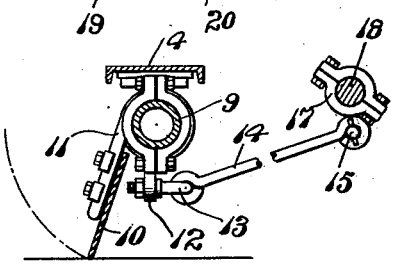
Fig. 3 is a vertical section through the scraper, and the rock shaft and counter-shaft which operates the same.

The counter-shaft 18 is mounted on and carried by suitable plates 19 which are secured to the front hanger brackets and supporting bars 3, being a unit therewith. At one end it is equipped with a worm wheel 20 meshing with which is a vertically positioned worm 21 housed in a suitable housing 22 which is fastened at the front end of plate 19 as shown in Fig. 1. A vertical shaft 23 extends upwardly from the worm 21 along one side of the cab of the truck. A detachable ratchet crank 24 may be secured at the upper end of the shaft 23 for turning the same.

It is evident that the driver of the truck may readily operate the shaft 23 in either direction to raise or lower the scraper blade 10, and that the worm and worm wheel afford an effective lock to hold the scraper blade to any position to which it is moved. It is further apparent that by this simple means the counter shaft 18 may be very easily operated and there is a direct connection between it and the rock shaft 9. The connecting link, located at right angles to the axis of the counter shaft 18 is not subjected to eccentric stresses but only to a direct tension. There is reduction in strain on the truck frame due to much less drilling of the frame for the supporting members of the scraper. The operating means for raising and lowering the scraper blade accordingly is not only very simple but is particularly effective, while the durability of the construction is greatly increased over the structure shown in the pending application of Dean. The invention is defined in the appended claim and is to be considered comprehensive of all forms of structure coming within its scope.

We claim:

In a construction of the class described, a truck frame, a rock shaft, means depending from said truck frame for revolubly supporting said rock shaft, scraping mechanism mounted upon said rock shaft, plates rigidly fastened to said rock shaft supporting means, a counter-shaft rotatably mounted in said plates, means interconnecting the counter-shaft and the rock shaft whereby rotation of one causes rotation of the other and means for operating said counter-shaft.

In testimony whereof we affix our signatures.

GEORGE E. DEAN.
CHARLES G. WILLETT.